United States Patent Office 3,526,839
Patented Sept. 1, 1970

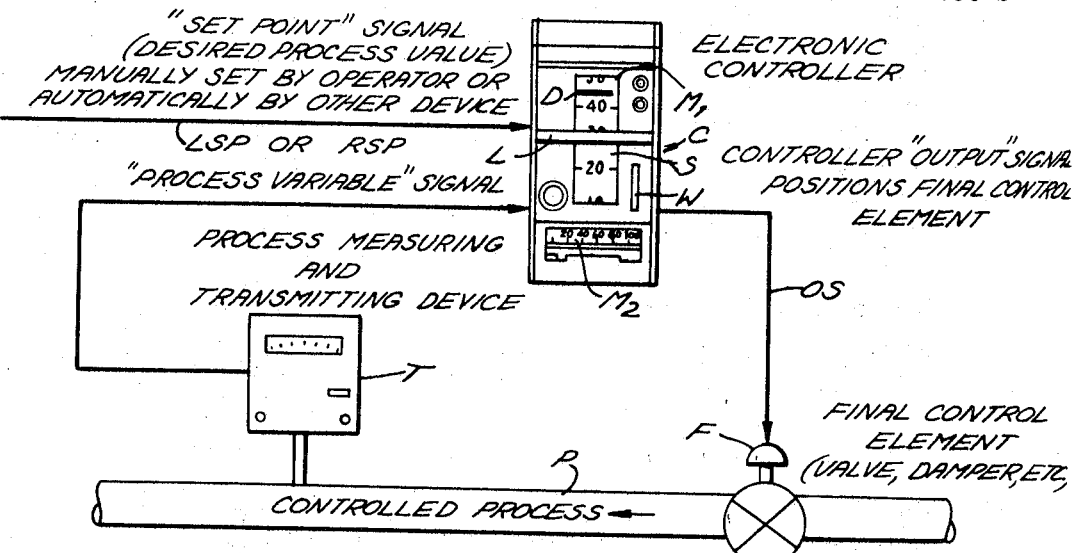
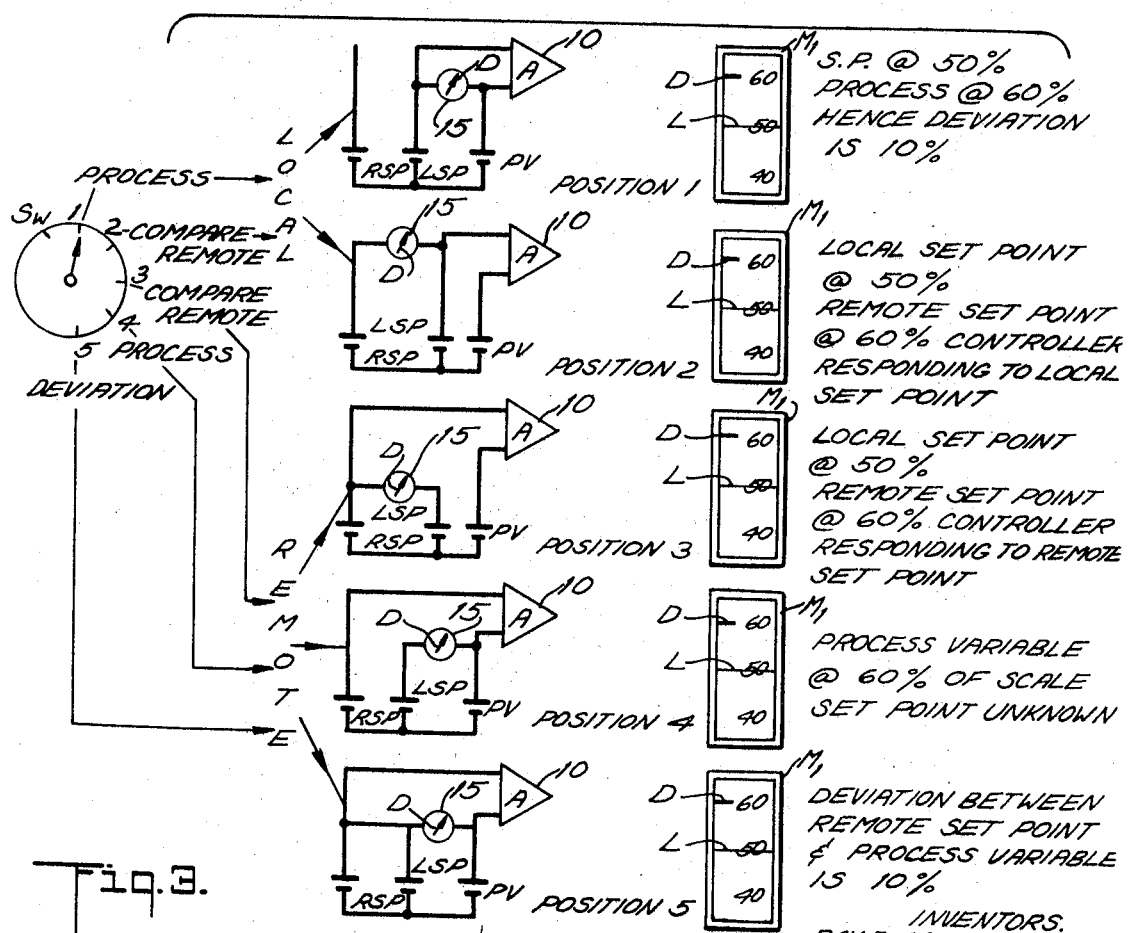
Fig. 2.
Fig. 3.

3,526,839
ELECTRONIC CONTROLLER FOR PROCESS CONTROL SYSTEM
Roy F. Schmoock, Ivyland, Hubert A. Riester, Jr., Huntingdon Valley, Peter S. Levesque, Warminster, and Isao Asai, Hatboro, Pa., assignors to Fischer & Porter Co., Warminster, Pa., a corporation of Pennsylvania
Filed Mar. 3, 1967, Ser. No. 620,391
Int. Cl. G05f 1/46
U.S. Cl. 328—1                    10 Claims

ABSTRACT OF THE DISCLOSURE

An electronic controller for a process control system provided with a final control element, the controller including a differential amplifier to which is applied input voltages representative of a process variable and a set point and which yields an output for operating the final control element. The output voltage of the amplifier is also applied through a feedback loop to the input thereof, the loop including an isolator to produce a floating feedback signal whereby the inputs and output of the controller may have a common connection.

---

This invention relates generally to electronic controllers, and more particularly to a solid state controller forming part of a process control system in which a signal representative of a process variable is compared with a signal representing a set point, to produce an output signal to operate a final control element.

An electronic controller is a component in a process control loop which is subject to disturbances, the controller acting in conjunction with other devices to maintain a process variable at a desired value. To accomplish this purpose, the controller receives, in terms of electrical values, both the desired or set point value and the process variable, the controller functioning to operate a final control element which directly and/or indirectly governs the process variable.

The factor controlled may be flow rate, pressure, viscosity, liquid level, or any other process variable. Thus the input signal of the controller may be derived from a rate-of-flow meter whose reading is translated into a corresponding electrical value. The output of the controller may be impressed on a flow-regulating valve, which valve is opened or closed or is caused to assume an intermediate position as determined by the controller. The specific nature of the process variable and the final control element is not the concern of the present invention, which is applicable to all forms thereof.

Electronic controllers are generally classified by the type of control action or modes of control they provide. In electronic controllers, the modes commonly used are proportional, proportional-plus-reset, proportional-plus-rate, and proportional-plus-reset-plus-rate.

In the proportional mode, the process variable input signal is compared to the desired set point to produce a deviation signal which when applied to the controller causes a change in output signal proportional thereto. The degree of change in output signal for a given change in deviation signal depends on the proportional band, reset and rate times of the controller. Reset action causes a change in output proportional to the time integral of the deviation signal, whereas rate action causes the output signal to vary as the rate or change or the time derivative of the deviation signal. Rate action is used in conjunction with proportional and proportional-plus-reset actions.

Among the basic functions encountered in an electronic controller capable of operating in one or more modes, are error computation and error data processing. Error computation entails subtraction of the incoming process variable from a given set-point signal. Error data is extracted by a certain type of operational amplifier provided with a feedback network.

The main object of the present invention is to provide an improved electronic controller having the following desirable characteristics:

(I) A common signal reference potential or bus for the process variable and set-point signal inputs as well as for the signal output.

(II) Independence of the controller characteristics from varying output load conditions.

(III) Adjustability of proportional gain, rate and reset times.

(IV) A single valued low-voltage D-C supply for powering all circuits of the controller.

(V) A bumpless transfer arrangement for shifting the operation from manual to automatic control, that is, a transfer free of abrupt transition effects.

(VI) A switching arrangement to switch the set-point signal line from a local to a remote set-point source, and to permit an operator to check the differences therebetween, whereby the difference may be set to zero to effect bumpless transfer of set-points.

Briefly stated, these objects are attained in a controller wherein the process variable signal and the set-point signal are applied to a differential amplifier having a feedback loop. The feeback signal is the output signal which has been processed by reset and proportional means, and it has to be further subtracted from the error signal. Under these conditions, in order to maintain a common connection for the inputs and the output of the controller, an isolator is incorporated in the feedback loop to cause the feedback signal to float. Also provided is a manual control station to control the final control element in place of the automatic operation effected by the controller, with means including a second isolator to introduce a voltage representative of the manual control voltage into the feedback loop when switching from manual to automatic control.

For a better understanding of the invention, as well as other objects and further features thereof, reference is made to the following detailed description to be read in conjunction with the annexed drawing wherein:

FIG. 2 is a block diagram of the system; and

FIG. 3 illustrates the operation of the local-remote switch for the system.

THE CONTROLLER

Figure 1:
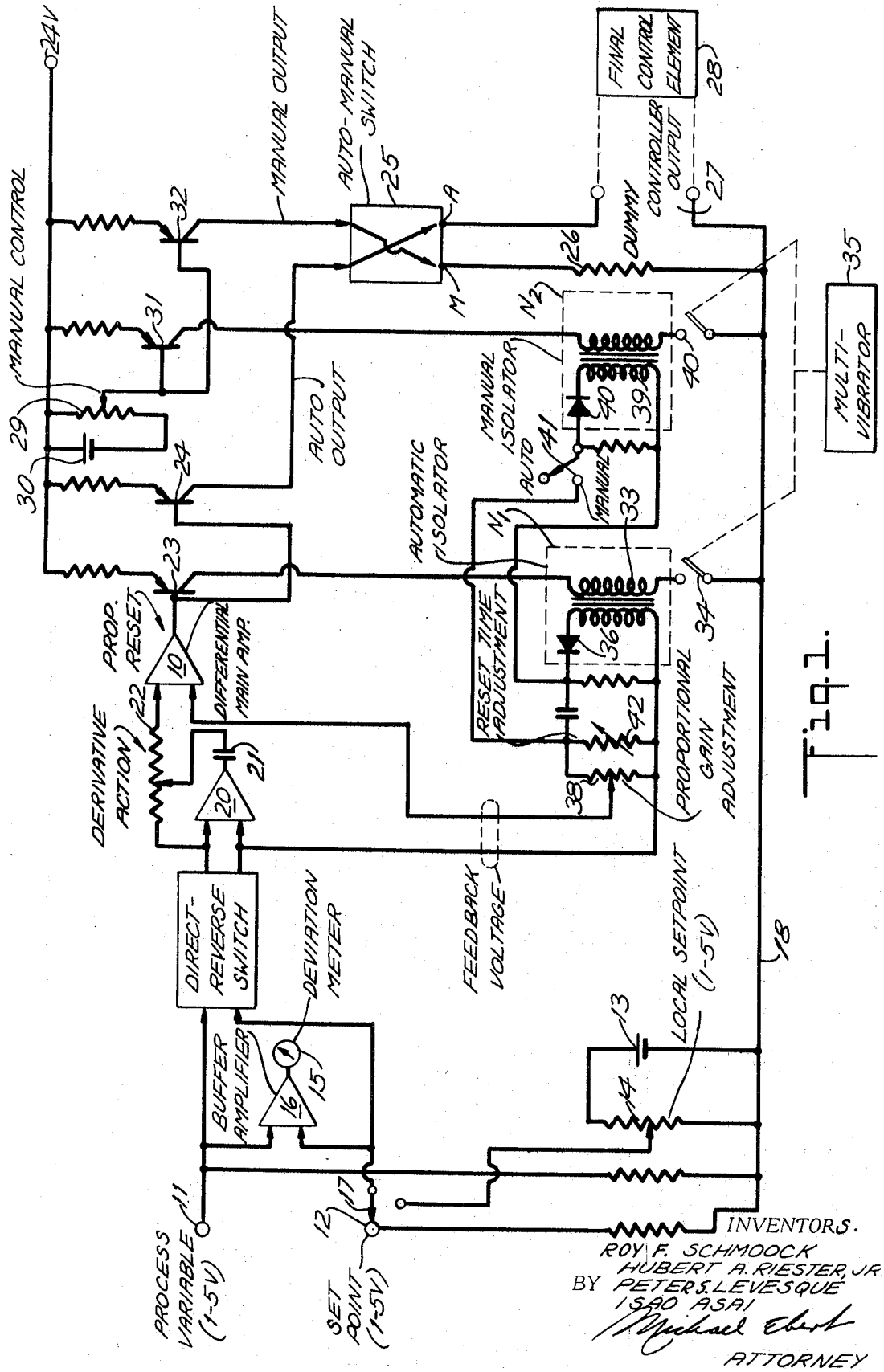
FIG. 1 is a schematic diagram of a process control system including an electronic controller in accordance with the invention.

Referring now to the drawing, and more particularly to FIG. 1, the electronic controller in accordance with the invention includes a main amplifier 10 for proportional and reset operation, the amplifier being essentially a differential amplifier. Applied to input terminal 11 is an electrical signal (i.e., 1 to 5 volts, D-C) which is proportional to the process variable in the system. A set-point signal is applied to a second input terminal 12 (i.e., 1 to 5 volts, D-C). Alternatively the set-point signal may be derived from a local source 13, through a potentiometer 14.

In operation, the controller functions to detect the deviation of the process variable from the desired set-point to produce an output which is applied to a final control element to return the process variable automatically to this set-point.

The deviation of the process variable from the local or remote set-point is indicated by a deviation meter 15, which is connected through a buffer amplifier 16 between input terminals 11 and 12. A selector switch 17 acts to apply either the local or the remote set-point voltage to one input of buffer amplifier 16, which serves to maintain a high input impedance to the deviation signal and a low impedance to the deviation meter. It will be noted that all of the input voltages are applied with reference to a common base conductor 18.

The process variable signal and the local or remote set-point signal are applied through a direct-reverse switch 19 to the input of the main amplifier 10 by way of a derivative action or rate circuit constituted by an A-C amplifier 20 whose output is connected through capacitor 21 to the slider of a potentiometer 22 in series with one input of main amplifier 10.

Switch 19 establishes a direct or reverse acting controller depending upon the output control device and system requirement. Direct action is defined as increasing process (error signal)—output increases (set-point constant). Reverse action is defined as increasing process (error signal)—output decreases (set-point constant).

The output of main amplifier 10 is fed to a two-stage coupling circuit including transistors 23 and 24. The output of transistor 24 is fed through an automatic-manual operation switch 25 either to a dummy load resistor 26 or to the output terminals 27. The final control element 28 is connected to these terminals.

Manual control of final control element 28 is effected by a potentiometer 29, shunted across a low-voltage D-C source 30, the output of the potentiometer being applied through transistor coupling stage 31 and 32 to the automatic-manual operation switch 25.

The arrangement is such that when switch 25 is on "manual," the output of transistor 32 in the manual control circuit, whose potentiometer 29 may be operated by a remotely controlled motor, is applied to final control element 28, whereas the output of the controller amplifier 10 is then applied to dummy load 26. But when switch 25 is on "automatic," the connections to the final control element and the dummy load are reversed. The final control element, which may be a current-responsive valve, acts on the process variable to effect automatic adjustment thereof with reference to a set-point or manual adjustment thereof with reference to the setting of potentiometer 29, depending on the operative position of switch 25.

As pointed out previously, in the controller, which includes differential amplifier 10, the essential functions of error computation and error data processing take place. Error computation basically entails subtraction of the incoming process variable applied at terminal 11 from a given set-point signal applied at terminal 12. Error data is processed by a feedback network from the output of the differential amplifier to the input thereof.

The feedback signal is the output signal which has been processed by the reset and proportional means. The feedback signal must be subtracted from the error signal in the differential amplifier and for this purpose, another summing junction is necessary. But since it is desirable to have an output conneciton common with the input connections (line 18), this can only be done by isolating the feedback signal from the common line, otherwise the output could not have a connection common with the inputs.

To this end, an isolation network $N_1$ is provided constituted by a transformer 33 whose primary coil is connected to the output of the first transistor 23 in the output coupling circuit of the differenial amplifier 10. The second transistor 24 in the coupling circuit, which links differential amplifier 10 to final control element 28, functions as a buffer amplifier and current source so that output loading conditions are not reflected to disturb the stability of the feedback loop.

The output signal of the transistor 23 is a direct current of varying amplitude, and in order to provide a floating feedback signal it is necessary to convert this voltage into an A-C signal of corresponding amplitude which can be conveyed through an alternating current path, such as a transformer. For this purpose, a chopper switch 34 is provided in the primary circuit of transformer 33, which switch may be any known form of optical, mechanical or electronic chopper to interrupt or alter the direction of the D-C current periodically and thereby convert the D-C signal into an A-C signal. Thus the chopper switch may be a transistor device under the control of a multivibrator 35 operating, for example, at 33 kc. This relatively high switching frequency makes it possible to reduce the size of transformer 33 and to maintain stability of the feedback loop containing amplifier 10, transistor 23, the reset and proportional network and the isolator.

The resultant feedback pulses, which are derived from the secondary of transformer 33, are rectified by a diode 36 and applied through a capacitor 37 to a potentiometer 38 to provide a feedback signal which is fed to an input of differential amplifier 10, to be added directly on top of either the set-point input or the process variable input, depending on the setting of the direct-reverse switch 19. Inasmuch as the isolator makes the feedback signal float, it is thereby possible to retain the common output connection. Adjustment of potentiometer 38 in the feedback loop controls proportional gain. Reset time is adjusted by changing the time constant determined by capacitor 37 and the potentiometer 42.

To afford a wide proportional band, the feedback signal must have a wide dynamic range, such as five times the input span. If the input span is 4 volts, a twenty-volt span is necessary to achieve 500% proportional band. This can be effected by giving the isolator a gain of 5.

Ordinarily, in an electronic controller, when switching over from manual to automatic, there is a transitional period wherein the output current-responsive final control element is subject to a signal which by reason of an unpredictable voltage across the reset capacitor can depart sharply from its intended adjustment. This is known as a valve "bump" which can have adverse effects.

In order to obtain a bumpless transfer from manual to automatic, another isolator $N_2$ is provided including a transformer 39 whose primary is coupled to the output of transistor 31 in the manual control circuit, the second transistor 32 serving as a buffer amplifier to prevent output loading conditions from being reflected in the isolator $N_2$. The direct-current in the primary of transformer 39 is converted into pulses by means of a chopper device 40, also under the control of multivibrator 35.

The pulses induced in the secondary of transformer 39 are rectified by diode 40 to provide a direct voltage whose magnitude is proportional to the manual station output current, which voltage is applied through an auto-manual switch 41 across capacitor 37 in the feedback loop.

Thus when switch 41 is closed during manual operation, and the final control element 28 is under the control of a manually-adjusted voltage, capacitor 37 in the feedback network of the automatic controller systems attains a charge at a level proportional to the manual station output. Thereafter, when switching over to automatic operation, the automatic control system initially responds to the voltage stored across capacitor 37 and its error signal is zero, thereby avoiding a bump in the transition period.

THE CONTROL LOOP

Referring now to FIG. 2, the electronic controller shown in FIG. 1 is now illustrated as a component designated by letter C in a typical process control loop, the controller acting in conjunction with other devices automatically to control a process variable at a predetermined set point. The process variable value is generated by a process measuring and transmitting device T which senses the controlled process P which may be a fluid flowing in a conduit. Controller C acts to compare the process variable value PV with the set-point value, which value when local in nature is designated as LSP and when remote, as RSP, both of which values are in the form of D-C voltage signals. The controller derives from this comparison an error signal. The set-point generator may be either an internal circuit in the controller, as shown in FIG. 1 (elements 13 and 14) or a remotely connected device, such as a manual loading station, ratio station, or another controller (cascade).

Controller C operates on the error signal by an adjustable action. In adjusting this control action, the controller objective is to produce an output signal OS that will operate the final control element F, which is generally a valve, to minimize both the duration and magnitude of the error signal that may result from a process load change or a change in set-point.

As indicated in connection with FIG. 1, variations in controller action are obtained by adjustment of parameters associated with the control modes. Proportional action produces an output signal OS proportional to the deviation of the controlled variable PV from the set point LSP or RSP. The amount of deviation of the controlled variable from the set point required to move the final control element through the full range is known as the "proportional band." A controller with a wide proportional band (high percent) is a low-gain controller; a controller with a narrow proportional band (low percent) is a high-gain controller.

Reset action (also known as integral action) produces a corrective signal proportional to the length of time the controlled variable PV has been away from the set point LSP or RSP to correct for load changes. The reset is expressed as the length of time required for the reset circuit to produce an output change equal in magnitude to that produced by proportional action.

Derivative action (also known as rate action) produces a corrective signal proportional to the rate at which the controlled variable PV is changing from the set point. This derivative action, expressed in minutes, is the amount of time by which proportional action (or proportional plus reset) is advanced.

Controller C is provided with means adapted to give a visual indication of process, set point, and deviation of the process from set point, as well as output. On the front panel of the controller is an indicator $M_1$ having a vertical rotating tape (0–100%) scale graduated in suitable increments, a fixed reference line L, and a meter movement pointer D. This meter movement is meter 15 in FIG. 1.

The tape scale is rotated by a thumb wheel W to a position at which the fixed reference line L overlying the scale indicates the desired set point of the process variable. The movable pointer D on the scale indicates the process. The deviation between the fixed reference point and the movable pointer represents the amount of deviation of process from set point. In practice, the arrangement may be made such that a 20% deviation from set point in either direction is visible at all times. The function of indicator $M_1$ will be explained in greater detail in the next section.

Output indicator $M_2$ has an 0–100% horizontal scale graduated in suitable increments and a meter movement pointer to indicate the direct-current output of the differential amplifier (10 in FIG. 1) or the manual control station that is being applied to the final control element F.

LOCAL-REMOTE SWITCH

In FIG. 1, the local-remote switch 17 serves only to apply the local or remote set-point signal to the controller. In practice, it is preferable to use a five-position selector switch SW, as shown in FIG. 3, to switch the set-point signal line from the internal or local set point generator (first two positions) to a remote or external set-point station (last three positions).

The advantage of this five-position switching arrangement is that it permits the controller operator to monitor a remote set point, so that "bumpless" transfer from local to remote set point can be obtained, and vice versa, by first pre-checking the existing difference between the local and remote set points, and then setting the difference to zero.

In the circuit arrangement produced by each switch position 1 to 5, one input of the differential amplifier 10 of the controller always receives its signal from the process variable PV. The other input of the amplifier, depending on the switch position, may receive its signal from either the local LSP or the remote set-point generator RSP. The functions of the five switch positions are as follows:

Position 1—"Local," Process
Position 2—"Local," Compare remote
Position 3—"Remote," Compare remote
Position 4—"Remote," Process
Position 5—"Remote," Deviation When the switch is set in either of the two "local" positions, differential amplifier 10 receives its set-point signal from the internally generated set point LSP. When the switch occupies any of the three "Remote" positions, amplifier 10 receives its set point signal from the remote generator RSP. In both situations, the differential amplifier sees the difference between the set points, whether local or remote, and the process variable. The five positions will now be analyzed in greater detail.

Position 1: This is the normal operating condition when the local set point is used (the thumb wheel W). This switch position produces a circuit arrangement as shown in the associated diagram in which the PV goes to one input, and LSP to the other input of the differential amplifier 10, meter 15 having pointer D being shunted across the inputs. As shown in the example, which presents the face of indicator $M_1$ there is indicated an SP of 50%, process at 60%; hence the deviation is 10%.

Position 2: This position permits the operator to compare the remote set-point RSP as used, for example, on cascade loops, with local LSP before he transfers to RSP. To effect bumpless transfer, he must change RSP to agree with LSP, before he proceeds to transfer to remote. In this switch position as shown in the associated diagram, one input of amplifier 10 is connected to LSP, and the other to PV, whereas meter 15 is connected between PSP and LSP to indicate the difference therebetween. In the example shown on the face of indicator $M_1$, the local set point LSP is at 50%, the remote set point RSP is at 60%, the controller responding to the local set point.

Position 3: This is the same as position 2, except that amplifier 10 now responds to RSP rather than LSP. As shown in the associated diagram, meter 15 is connected between RSP and LSP to indicate the difference therebetween. In the example shown, indicator $M_1$ has the local set point at 50%, the remote set point at 60%, the controller responding to the remote set point.

Position 4: In this position of switch SW, the operator is using the LSP as a hand balance potentiometer to measure the process variable PV, while the controller is responding to RSP. In the associated diagram, it will be seen that meter 15 is now between PV and LSP, whereas RSP is connected to one input of the amplifier 10, the other input going to the process variable PV. In the indicator example shown, the process variable PV is at 60% of the scale, but the set point is unknown.

Position 5: This is the normal operating condition when RSP is used. It will be seen in the associated diagram that amplifier 10 has one input connected to PV and the other to RSP, the meter 15 being connected between PV and RSP. Indicator $M_1$ shows that the deviation between RSP and PV is 10%.

While there has been shown and described a preferred embodiment of electronic controller for process control system in accordance with the invention, it will be appreciated that many changes and modifications may be made therein without, however, departing from the essential spirit of the invention as defined in the annexed claims.

What we claim is:
1. In a process control system having a final control element, an electronic controller for operating said final control element, comprising:
   (A) a differential amplifier having two inputs and a a single output,
   (B) means to apply D-C input voltages representative of a process variable and a set-point to the respective inputs of said amplifier relative to a common connection,
   (C) means to derive a direct output current from the single output of said amplifier which depends on the deviation of said process variable from said set-point and to apply it to said final control element relative to said common connection, and
   (D) a feedback loop to apply a D-C feedback signal related to the output current of said amplifier to one of the inputs thereof to be added to one of said D-C input voltages, said loop including an isolator to render said signal floating and constituted by an isolation transformer whose primary is coupled to the output of said amplifier through a chopper to provide an A-C signal, and whose secondary is coupled to a rectifier to provide said floating D-C feedback signal.

2. In a system as set forth in claim 1, further including means to vary the magnitude of said feedback signal to provide proportional-mode gain adjustment.

3. In a system as set forth in claim 1, further including a derivative action network in advance of said differential amplifier.

4. In a system as set forth in claim 1, wherein said chopper is constituted by a switch periodically activated by a multivibrator.

5. In a system as set forth in claim 1, further including means visually to indicate the process variable, set-point and deviation of the process variable from the set-point.

6. In a system as set forth in claim 1, further including means to visually indicate the output of the amplifier.

7. In a system as set forth in claim 1, wherein said set-point input to the controller is selectively derived from a local or a remote source.

8. In a system as set forth in claim 7, further including switching means to check the difference between local and remote set-points to permit setting of the difference to zero before effecting a transfer.

9. In a system as set forth in claim 1, further including a manual control station for producing a voltage to control said final control element, and switch means selectively in one position to apply the output of said station to said element and the output of said controller to a dummy load, and in a second position to apply said outputs in reverse.

10. In a system as set forth in claim 9, further including a second isolator coupling the output of said manual control station to a capacitor in said feedback loop when the system is on manual control to produce a charge thereacross proportional to said manual control voltage, which charge when the system is switched to automatic control prevents an abrupt transition.

References Cited
UNITED STATES PATENTS

| | | | |
|---|---|---|---|
| 2,901,563 | 8/1959 | McAdam et al. | 330—9 |
| 2,917,696 | 12/1959 | Michaels | 330—9 |
| 2,974,237 | 3/1961 | Ehret | 307—229 |
| 3,077,566 | 2/1963 | Vosteen | 330—9 |
| 3,197,711 | 7/1965 | Richardson | 330—103 |
| 3,371,286 | 2/1968 | Lovelace | 330—30 |
| 3,413,561 | 11/1968 | Hogan | 330—9 |

DONALD D. FORRER, Primary Examiner

H. A. DIXON, Assistant Examiner

U.S. Cl. X.R.
328—3; 307—229, 235